US007774499B1

(12) United States Patent
Popek et al.

(10) Patent No.: US 7,774,499 B1
(45) Date of Patent: Aug. 10, 2010

(54) ACCELERATING NETWORK COMMUNICATIONS

(75) Inventors: Gerald Popek, Los Angeles, CA (US); Shane Blaser, Camarillo, CA (US); Randall Tamura, Los Angeles, CA (US); Thod Nguyen, Simi Valley, CA (US); Terry Warren, Santa Ana, CA (US)

(73) Assignee: United Online, Inc., Woodland Hills, CA (US)

( * ) Notice: Subject to any disclaimer, the term of this patent is extended or adjusted under 35 U.S.C. 154(b) by 1337 days.

(21) Appl. No.: 10/699,439

(22) Filed: Oct. 30, 2003

(51) Int. Cl.
*G06F 15/173* (2006.01)

(52) U.S. Cl. .................. 709/242; 709/217; 709/218; 709/219; 709/232; 707/4; 707/6; 707/10; 707/101; 707/104.1

(58) Field of Classification Search .......... 709/232, 709/242
See application file for complete search history.

(56) References Cited

U.S. PATENT DOCUMENTS

| | | | | |
|---|---|---|---|---|
| 5,404,505 | A | | 4/1995 | Levinson |
| 5,497,115 | A | * | 3/1996 | Millar et al. ................ 327/211 |
| 5,768,515 | A | * | 6/1998 | Choquier et al. ............ 709/206 |
| 6,029,175 | A | | 2/2000 | Chow |
| 6,055,569 | A | | 4/2000 | O'Brien |
| 6,108,703 | A | * | 8/2000 | Leighton et al. ............ 709/226 |
| 6,144,988 | A | | 11/2000 | Kappel |
| 6,314,492 | B1 | | 11/2001 | Allen |
| 6,321,219 | B1 | * | 11/2001 | Gainer et al. .................. 1/1 |
| 6,389,422 | B1 | * | 5/2002 | Doi et al. ...................... 1/1 |
| 6,453,342 | B1 | | 9/2002 | Himmel |
| 6,510,469 | B1 | | 1/2003 | Starnes |
| 6,584,565 | B1 | * | 6/2003 | Zamek ...................... 713/156 |
| 6,763,468 | B2 | * | 7/2004 | Gupta et al. .................. 726/2 |
| 6,883,135 | B1 | * | 4/2005 | Obata et al. ................ 715/500 |
| 6,976,057 | B2 | * | 12/2005 | Yoshiasa ..................... 709/216 |
| 6,985,953 | B1 | * | 1/2006 | Sandhu et al. ............. 709/229 |
| 7,047,485 | B1 | * | 5/2006 | Klein et al. ................ 715/205 |
| 7,093,012 | B2 | * | 8/2006 | Olstad et al. ............... 709/224 |
| 7,159,014 | B2 | * | 1/2007 | Kausik et al. .............. 709/217 |
| 7,216,149 | B1 | * | 5/2007 | Briscoe et al. ............. 709/217 |
| 7,251,254 | B2 | * | 7/2007 | Bond et al. ................ 370/467 |
| 7,305,464 | B2 | * | 12/2007 | Phillipi et al. .............. 709/223 |

(Continued)

OTHER PUBLICATIONS

Network Working Group, Hypertext Transfer Protocol—HTTP/1.1, RFC 2616 (Jun. 1999).

*Primary Examiner*—John Follansbee
*Assistant Examiner*—Backhean Tiv
(74) *Attorney, Agent, or Firm*—SoCal IP Law Group LLP; Steven C. Sereboff; Mark A. Goldstein (57) ABSTRACT

There is disclosed a method for accelerating network communications. The method may be implemented on a server computer or other computing device. The method may exist as a software program and may be stored on a storage medium. The method may include receiving a request, forwarding the request to a server, receiving a response from the server, and reviewing the response to determine whether the response includes a native expiration. When the response does not include the native expiration, a calculated expiration for the response may be computed. The calculated expiration may be inserted into the response creating an amended response. The amended response may be forwarded to the client. When the response includes the native expiration, the response may be forwarded to the client. The amended response may be stored and provided to other requesters.

49 Claims, 6 Drawing Sheets

U.S. PATENT DOCUMENTS

| | | | |
|---|---|---|---|
| 7,315,884 B2 * | 1/2008 | Mogul | 709/217 |
| 7,346,667 B2 * | 3/2008 | Ashcroft et al. | 709/219 |
| 7,441,045 B2 * | 10/2008 | Skene et al. | 709/241 |
| 7,552,220 B2 * | 6/2009 | Marmigere et al. | 709/228 |
| 2001/0013096 A1 * | 8/2001 | Luckenbaugh et al. | 713/154 |
| 2001/0037469 A1 * | 11/2001 | Gupta et al. | 713/202 |
| 2001/0042045 A1 * | 11/2001 | Howard et al. | 705/51 |
| 2001/0056444 A1 * | 12/2001 | Ide et al. | 707/513 |
| 2002/0049679 A1 * | 4/2002 | Russell et al. | 705/52 |
| 2002/0062384 A1 * | 5/2002 | Tso | 709/229 |
| 2002/0069365 A1 * | 6/2002 | Howard et al. | 713/201 |
| 2002/0124100 A1 * | 9/2002 | Adams | 709/232 |
| 2002/0194382 A1 | 12/2002 | Kausik | |
| 2003/0028606 A1 | 2/2003 | Koopmans | |
| 2003/0033601 A1 * | 2/2003 | Sakata et al. | 725/29 |
| 2003/0069854 A1 * | 4/2003 | Hsu et al. | 705/59 |
| 2003/0140121 A1 * | 7/2003 | Adams | 709/219 |
| 2003/0160823 A1 * | 8/2003 | Stannard | 345/764 |
| 2003/0188106 A1 * | 10/2003 | Cohen | 711/133 |
| 2003/0217163 A1 * | 11/2003 | Lagerweij et al. | 709/229 |
| 2004/0003101 A1 * | 1/2004 | Roth et al. | 709/231 |
| 2004/0068579 A1 * | 4/2004 | Marmigere et al. | 709/242 |
| 2004/0098468 A1 * | 5/2004 | Kang | 709/219 |
| 2005/0055449 A1 * | 3/2005 | Rappold | 709/228 |
| 2005/0074126 A1 * | 4/2005 | Stanko | 380/279 |
| 2007/0268930 A1 * | 11/2007 | Bond et al. | 370/467 |
| 2008/0209069 A1 * | 8/2008 | Aoki et al. | 709/235 |
| 2008/0215672 A1 * | 9/2008 | Kloba et al. | 709/203 |

* cited by examiner

ACCELERATING NETWORK COMMUNICATIONS

NOTICE OF COPYRIGHTS AND TRADE PRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

This invention is related to network communications.

2. Description of Related Art

The Internet is ubiquitous in modern society. Many persons access the Internet by using a dial-up telephone connection to an Internet access provider (IAP). A person who uses an IAP subscribes to and pays a fee to access the Internet through the IAP. The IAP may provide additional services to a subscriber. In general, the IAP receives subscriber requests for information and obtains the requested information from a source on the Internet. The information requested may be an Internet web page.

DETAILED DESCRIPTION OF THE INVENTION

Throughout this description, the embodiments and examples shown should be considered as exemplars, rather than limitations on the apparatus and methods of the present invention.

A System

Figure 1:
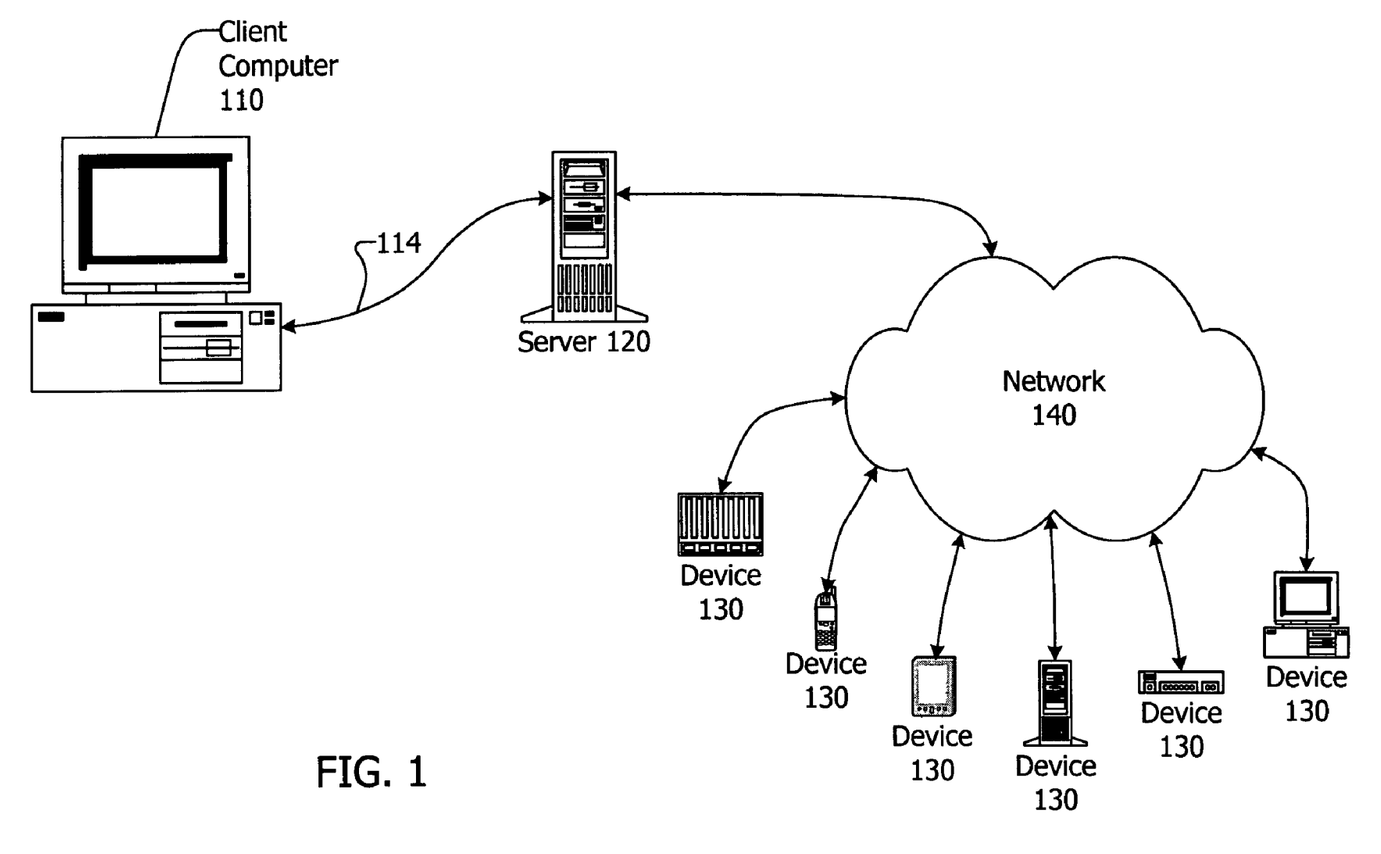
FIG. 1 is a block diagram of an environment in accordance with the invention.

FIG. 1 is a block diagram of a first environment in accordance with the invention. To access a network 140, a person may subscribe to a network access provider (NAP). Such a person is referred to herein as a subscriber. A NAP is a company that provides a subscriber access to a network 140, such as the Internet. A person who uses a NAP typically subscribes to and pays a fee to access the network 140 through the NAP. Typically, the subscriber uses a client computer 110 and establishes a connection 114 with a server computer 120 of the NAP. The server computer 120 provides access to the network 140. The connection 114 may be a persistent connection.

The server 120 may be a single server as shown, or may be a group of two or more servers, and may include network devices such as routers, gateways, switches and others. The client computer 110 may be coupled for communication with a server computer 120 which provides the client computer 110 access to the network 140, such as, for example, the Internet. The connection 114 between client computer 110 and server 120 may be wired or wireless, may be a dial-up telephone connection, and may be a broadband connection such as, for example, a digital subscriber line (DSL), cable, integrated services digital network (ISDN), and others. The connection 114 may include intermediate nodes and devices. These intermediate nodes may be modems, routers, switches, gateways, servers and others. Similarly, intermediate nodes and devices may exist between the server 120 and the network 140.

Information from devices 130 may be accessed by the subscriber via network 140. The client computer 110 may access and otherwise obtain information from devices 130 by establishing a connection with server 120. Server 120 provides client computer 110 access to network 140 and a myriad of devices 130 by communicating through network 140.

The techniques described herein may be implemented to increase the network communications throughput to a computing device and/or through a network server, resulting in accelerated network communications.

Client computer 110 may be a personal computer, as shown, or other computing device. Devices 130 may be web servers or other computing devices. A computing device as used herein refers to any device with a processor and memory that may execute instructions including, but not limited to, personal computers, server computers, computing tablets, set top boxes, video game systems, personal video recorders, telephones, personal digital assistants (PDAs), portable computers, and laptop computers. Computing devices may also include network devices such as routers, gateways, switches and others.

The client computer 110 or other computing devices may have a network interface card (NIC), wireless access device, or modem included therein or coupled thereto to allow for network communications such as, for example, communication with server 120 and over network 140 with devices 130.

The server computer 120 may be any server computer. The server computer 120 may include software, firmware, and/or hardware for providing the functionality and features of the invention. The invention may be embodied in whole or in part in software which operates on the server computer 120 and may be in the form of an application program, one or more subroutines, one or more plug-in modules, an operating system component or service, and others. The hardware and software of the invention and its functions may be distributed such that some functionality is performed by the server computer 120, and other functionality is performed by other computing devices which may be locally or remotely accessible.

The techniques discussed herein are described with regard to software which may be stored on, transferred from and/or executed from a storage medium in a storage device included with or otherwise coupled or attached to a computing device such as server 120. These storage media include, for example, magnetic media such as hard disks, floppy disks and tape; optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include, hard disk drives, DVD drives, flash memory devices, and others. The software that when executed implements the invention may be stored in RAM or other memory on server 120. The software that when executed implements the invention may also be obtained from another server computer or computing device locally or remotely accessible, such as, for example, over a network such as network 140, via a direct connection, and otherwise.

The network 140 may include or be one or more of a local area network (LAN), a wide area network (WAN), a storage area network (SAN), or a combination of these. The network 140 may be wired, wireless, or a combination of these, and may include or be augmented by satellite communications. The network 140 may include or be the Internet. The network 140 may be public or private, or a combination of public and private. The network 140 may be comprised of numerous nodes providing numerous physical and logical paths for data to travel. The network 140 may support one or more well known, proprietary, and other communications protocols, including, for example, lower level protocols such as Ethernet; higher level protocols such as the hyper-text transfer protocol (HTTP); transport layer protocols such as the User Datagram Protocol (UDP), the Transmission Control Protocol (TCP), and the Internet Protocol (IP); and others.

Figure 2:
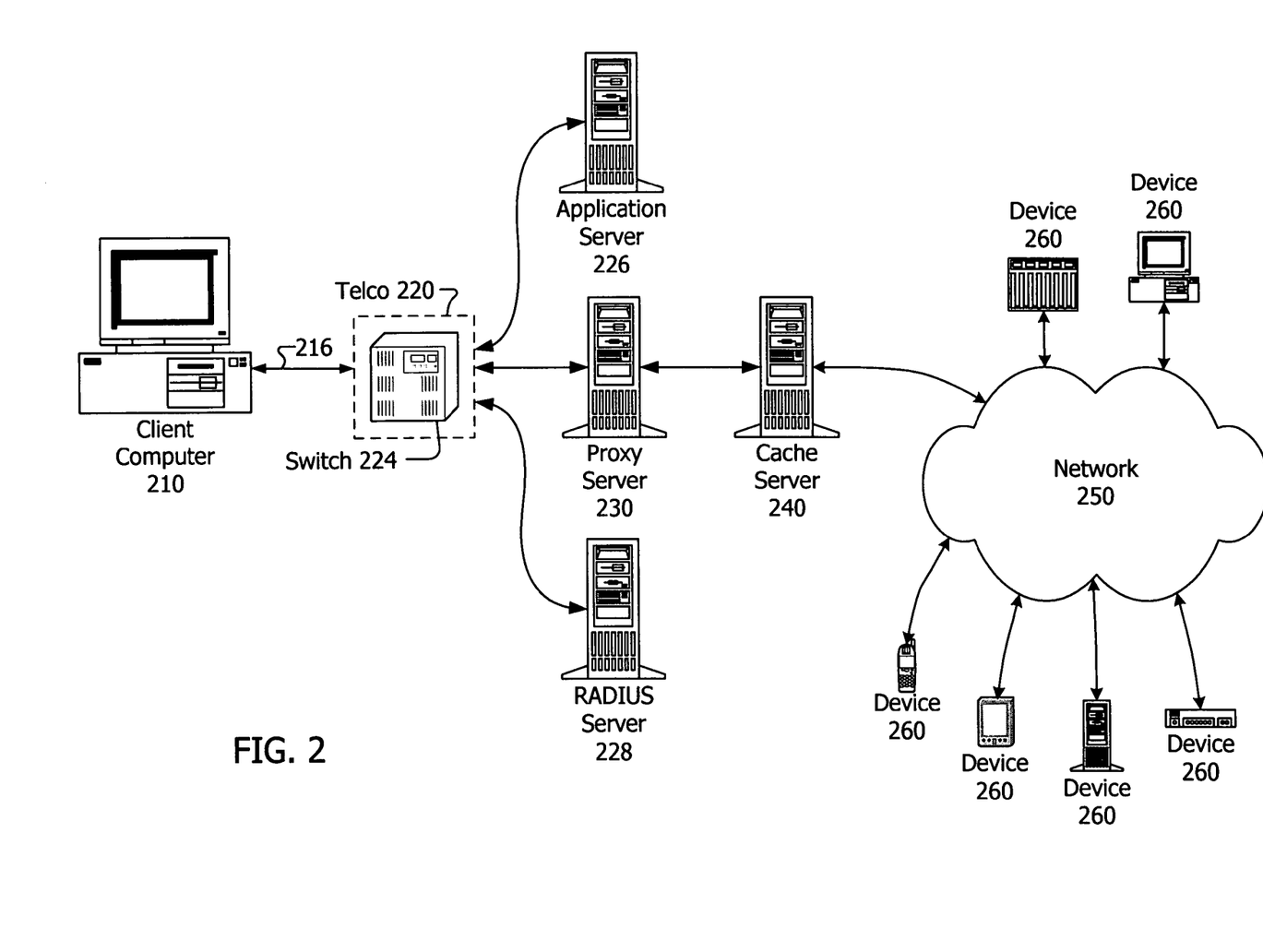
FIG. 2 is a block diagram of a second environment in accordance with the invention.

FIG. 2 is a block diagram of a second environment in accordance with the invention. In one implementation, the environment may include a client computer 210 that establishes a dial-up connection with a NAP. To achieve this dial-up connection, a connection 216 is established with a telephone company (telco) 220. A switch 224, gateway or other device at the telephone company may communicate with a Remote Authentication Dial-In User Service (RADIUS) server 228 to authenticate the subscription of the user of the client computer 210 with the NAP. A user or subscriber identifier may be passed to the RADIUS server 228. The RADIUS protocol and software may be used for authentication and accounting of dial-up subscribers. The telephone company 220 and/or the switch 224 may include or be a RADIUS client and may include or be a Network Access Server (NAS).

After the RADIUS server authenticates that the user of the client computer 210 is a registered subscriber, the switch 224, gateway or other device at the telephone company 220 may communicate with an application server 226 to obtain a token and to learn the level of service that is to be provided to the subscriber. The token may be a uniquely computed data item computed to ensure secure use of NAP services. In addition to the token, when the level of service is of a certain level that includes acceleration, the application server 226 may also pass a proxy server address to the subscriber at the client computer 210 through the switch 224. The 210 client computer then passes the token and the subscriber identifier to the proxy server 230 designated by the proxy server address provided by the application server 226. It is through the proxy server 230 that the subscriber at the client computer 210 gains accelerated access to the network 250 and devices 260.

The proxy server 230 may include software which achieves the methods described herein. The proxy server 230 may be coupled with a cache server 240. The cache server 240 is coupled to a network 250, such as the Internet. It is by communicating through the telephone company 220, the proxy server 230 and the cache server 240 that the client computer may access information available from devices 260 via the network 250. In some circumstances information requested by a NAP subscriber at client computer 210 may be available and served by local or remote cache server 240, or may be available in a cache included in the proxy server 230 and served by the proxy server. In other circumstances, the information requested by a NAP subscriber at client computer 210 may be requested from a device 260 via network 250. One or more of the devices 260 may be an origin server as defined below.

Software Architecture

Figure 3:
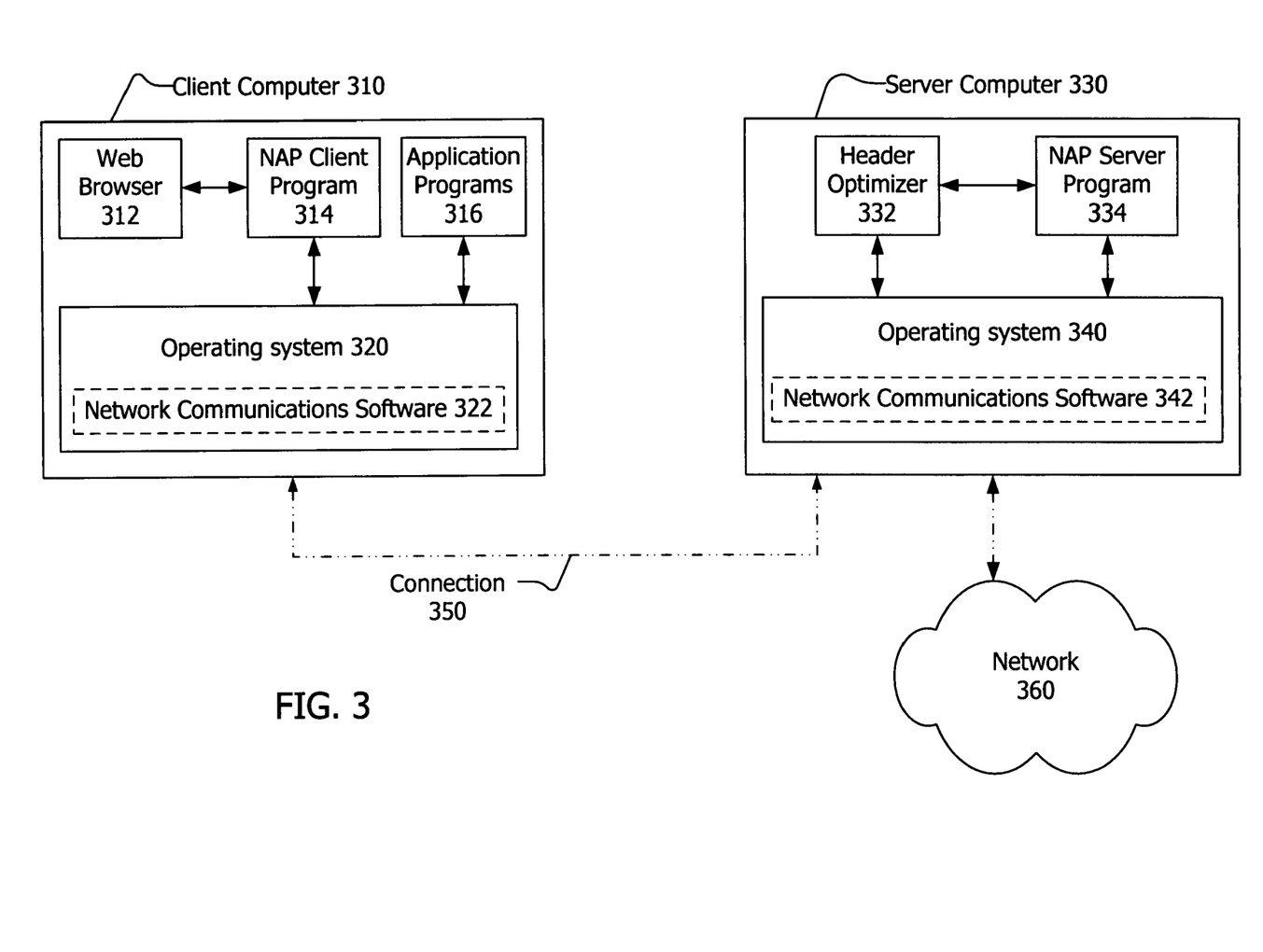
FIG. 3 is a block diagram of a software architecture in accordance with the invention.

FIG. 3 is a block diagram of a software architecture in accordance with the invention. The client computer 310 may be a computing device and may have an operating system 320 such as, for example, variations of the Linux, Unix, MS-DOS, Microsoft Windows, Palm OS, and Apple Mac OS operating systems. The operating system may include network communications software 322. The network communications software 322 is software that allows for communicating over a network. The network communications software 322 may provide support for communications according to protocols such as UDP, TCP, IP, and others.

The client computer 310 may include: an Internet web browser 312 such as Netscape Navigator, Microsoft Internet Explorer, Opera, and others; an NAP client program 314 such as that provided by NetZero, Juno and other NAPs; and application programs 316 such as word processors, spreadsheets, games, and others. The NAP client program 314 may have a web browser or similar software incorporated therein or integrated therewith. The NAP client program 314 may include a header optimizer client software module, plug-in or other software (not shown). The NAP client program 314 and/or the web browser 312 may provide support for HTTP and other higher level communications protocols. In one embodiment, the web browser 312 accesses a network such as network 360 through NAP client program 314.

A subscriber may use the NAP client program 314 to establish a connection 350 with a server computer 330. To achieve connection 350, the NAP client program 314 may establish a dial-up phone line connection, a DSL connection, a cable modem connection, and others, with a server computer 330. The NAP client 314 may support the Point-to-Point Protocol (PPP), and may also support the Password Authentication Protocol (PAP) or the Challenge-Handshake Authentication Protocol (CHAP).

When establishing the connection 350 with the server computer 330, the NAP client program 314 may provide subscriber information and NAP client program information to the NAP server program 334. The NAP client program information may include a version number of the NAP client program 314, and the subscriber information may include a subscriber identifier, subscriber profile information, and/or a subscriber level of service. Alternatively, the subscriber information may be solely a subscriber identifier, and the NAP server program 334 may access subscriber profile information, subscriber level of service, and/or other subscriber information from a NAP database (not shown) on or accessible by the server computer 330.

The NAP may provide multiple servers, proxy servers and cache servers which are accessed by subscribers based on the level of service the subscriber purchases. When the connection 350 is established, the NAP client program 314 may receive a server designation from the NAP server program 334 based on the level of service of the subscriber. The server designation may be the proxy server address described above with regard to FIG. 2. The NAP server program 334 may provide services to the NAP subscriber based on a level of service. The level of service may determine whether the acceleration techniques described herein and implemented via the header optimizer 332 should be invoked for the subscriber. The acceleration techniques may be made accessible to all subscribers, to subscribers having a NAP client program having a particular version number, and/or only to those subscribers paying for a particular level of service that includes accelerated communications.

When accelerated communications are to be provided, the NAP server program 334 may provide a proxy server address or other server address, such as a local host address, to the NAP client program 314. The NAP server program 334 may also provide a local proxy port to the NAP client program 314. In one embodiment, the NAP client program 314 sets a proxy address of the web browser 312 to be the local host address and specifies a local proxy port as provided by the NAP server program 334. The web browser 312 may then use the NAP Client program 334 to access the Internet and/or other network. In another embodiment, a subscriber using the web browser 312 communicates with and over the network 360 via the NAP client program 314. In this embodiment, the NAP client program 314 directs network communications to a server computer which is designated by the proxy address. Other proxy configurations are also contemplated.

The server computer 330 may be a server computer as known in the art, and may be a group, cluster or LAN of server computers which may be augmented with routers, gateways, switches and other network devices. The server computer may be the server computer 120 of FIG. 1, the proxy server 230 of FIG. 2, or may include both the proxy server 230 and the cache server 240 of FIG. 2. The server computer 330 may include an operating system such as, for example, variations of the Linux, Unix, Microsoft Windows, and Apple MAC OS operating systems. The operating system may include network communications software 342 that allows for communication over a network. The network communications software 342 may provide support for communications according to protocols such as UDP, TCP, IP, and others. The network communications software 342 may provide support for wired and/or wireless network communications.

The server computer 330 may include NAP server program 334 which is used to serve communications with the NAP client program 314 on client computer 310. The NAP server program 334 may provide support for HTTP and other higher level communications protocols. The methods described herein may be implemented as software referred to as header optimizer software 332. The header optimizer software 332 may be included in the NAP server program 334, may be a plug-in to the header optimizer software 332, and may execute on the server computer 330.

The server computer 330 prepares responses to requests received from the web browser 312 and/or the NAP client program 314 on client computer 310. The NAP server program 334 may receive requests from client computer 310. In response to a request, the server computer 330 may fulfill the request by referring to local data, may fulfill the request by referring to a cache server (not shown), or may forward the request to a server on network 360. The cache server may be a server known in the art, may be like the cache server 240 of FIG. 2, and may be local or remote to the server computer 330.

With regard to FIGS. 1, 2 and 3 and the discussion thereof, additional and fewer units, modules or other arrangement of software, hardware and data may be used to achieve the invention described herein.

Methods

Figure 4:
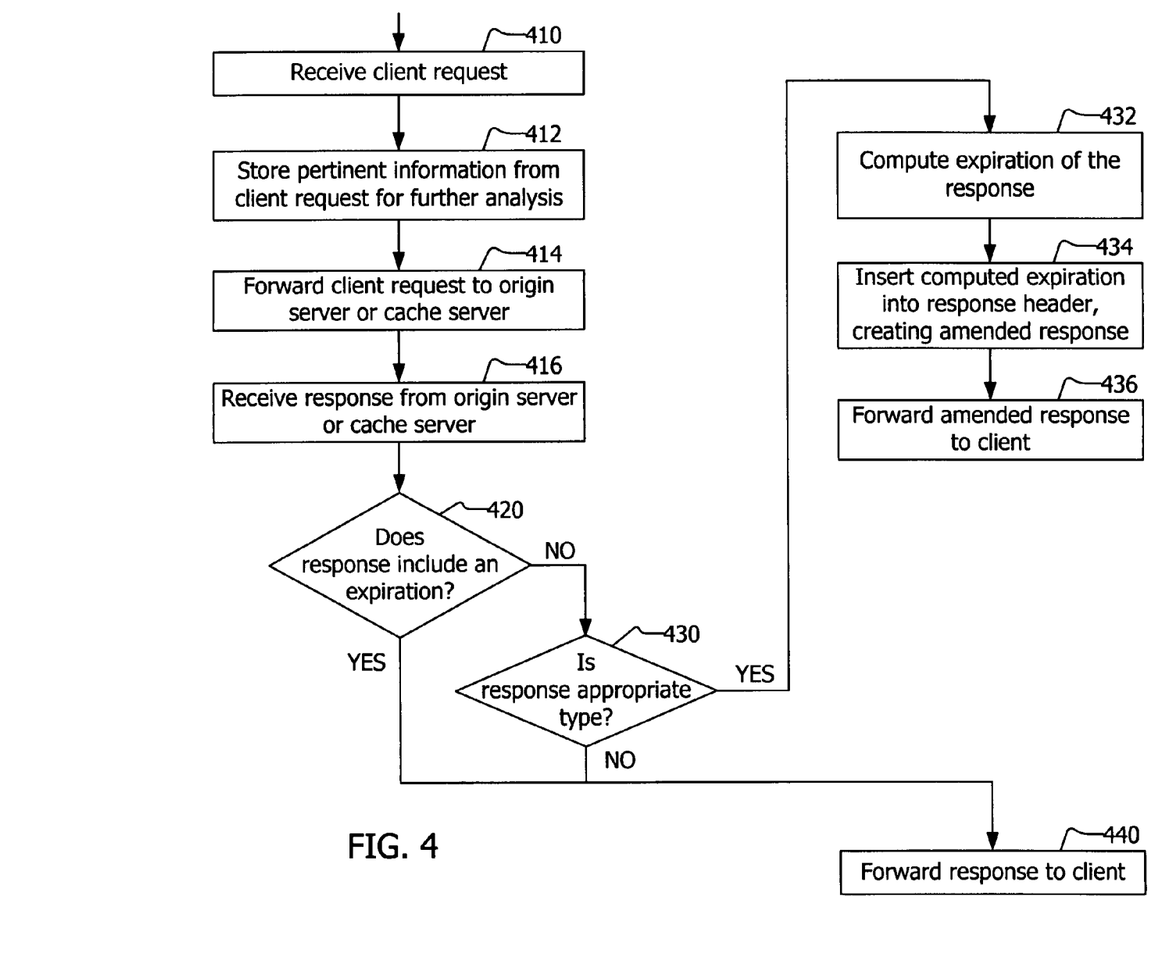
FIG. 4 is a flow chart of a method in accordance with the invention.

FIG. 4 is a flow chart of a method in accordance with the invention. A client request is received, as shown in block 410. The request may be an HTTP GET method. The request may specify a resource. The resource may be identified in various ways, such as, for example, by a Uniform Resource Identifier (URI), which may be a Uniform resource Locator (URL). The resource may be a file and may be a single object. The resource may be a file containing a list of multiple objects. An object may be a single graphics file such as, for example, a Graphics Interchange Format (GIF) or Joint Photographic Experts Group (JPEG) file. There may also be other kinds of objects, including, but not limited to, audio, video, multimedia, and others. Pertinent information from the client request may be stored for further use and/or analysis, as shown in block 412. The client request may be forwarded to a server, and the server may be an origin server, cache server or other kind of server, as shown in block 414. An origin server is a server that hosts the original version of the resource or object specified in the request. The origin server may be specified as part of the URI.

A response is received form the origin server, the cache server or other server, as shown in block 416. A check may be made to determine whether the response includes an expiration, as shown in block 420. This expiration may be referred to as a native expiration, as it is an expiration that was included in the response by the origin server. This check may be made by examining the "Expires" field of the response when the response conforms to the HTTP protocol. If the response includes an expiration, no changes are made to the response, and the response is forwarded to the client, as shown in block 450.

If the response does not include an expiration, a check is made to determine whether the response is an appropriate type, as shown in block 430. In one embodiment, the acceleration methods by header modification described herein are used only with those types of files included in an appropriate type list. A response is an appropriate type when it is or includes an object or one or more objects that is/are in the appropriate type list or group. The appropriate type list or group may include various types of files and objects, and, in particular, any files or objects referenced in a web page or other file. The web page may be controlled by a Hyper-Text Markup Language (HTML) file or other kind of file. The appropriate type list or group may include various types of files and objects referenced in an HTML or other file, including Multipurpose Internet Mail Extensions (MIME) file types. The appropriate type list may include graphic files such as JPEG and GIF files, portable document format (PDF) files and postscript files. The appropriate type list may include multimedia files such as HTML files, Windows Media Files, Moving Pictures Experts Group (MPEG) files, RealMedia files, QuickTime files, Flash files, as well as executable programs, JavaScript files, Cascading Style Sheet (CSS) files, and others.

In another embodiment, the acceleration methods by header modification described herein are used when certain characteristics of the files or transactions requested conform to system defined specifications such as file size, file creation date, file creation program, specified URI, specified server, and others.

If the response is an appropriate type, an expiration for the response may be computed, as shown in block 442. The computed expiration may be inserted in the response, creating an amended response, as shown in block 444. The expiration may be inserted as an "Expires" header when the response is an HTTP response. As such, the methods described herein may be referred to as header injection. The amended response may be forwarded to the client, as shown in block 446. The amended response may be forwarded in place of the response received from the origin server.

In conjunction with this method, a copy of the response, the amended response, and/or the objects contained in the response may be stored or cached for future use. This may occur, for example, after or in conjunction with blocks 436 and 440. The caching or storing may occur at a server, such as a local or remote proxy server or cache server. The storing or caching may be to a volatile and/or non-volatile storage medium (e.g., RAM, hard disk) coupled with the server. In this way, when other subscribers/clients request the object, the stored or cached object may be provided to the client without having to forward the request to the origin server. This storing/caching reduces the number requests that are made to origin servers, reduces the processing and network communications overhead associated with forwarding requests, and causes the network communications to accelerate.

When a client receives the response, the response and/or the object or objects in the response may be cached or otherwise stored by the web browser or otherwise by the client for later use. The web browser of the client may manage its own cache and store responses and/or the object or objects received in a response. Typically, when a web page is specified by a subscriber, a client web browser will check to see if an object included in the specified web page is in its cache, and, if so, whether it has expired before requesting the object or the web page from a server.

When a subscriber specifies a web page, the web page is comprised of numerous objects. Each graphic on a web page may be a separate object. When a server serves objects that are lacking an expiration, the subscriber's web browser must always request the object from the server, even though the object has not changed on the server, or on the origin server. This causes the server to process the request and return an "OK", "not modified" or similar response to the client. This causes the client to create and make the request, and then process the response. In these cases, responses and objects that do not have an expiration cause processing resources to be needlessly expended both on the client and on the server, and cause needless messages to be exchanged between the client and the server.

The methods described herein explain how a server may add an expiration to objects received from a server such as, for example, an origin server. A NAP server may provide the amended response to a client in place of an original response. As such, when the client attempts at a later time to access the object that was included in the response, the web browser retrieves the object from a cache associated with the web browser on the client machine. Adding an expiration to an object reduces the number of unneeded requests made by the client to the server. The reduced number of requests generated by clients is magnified by the number of subscribers that are serviced by a particular server or NAP server. The server or NAP server, therefore, expends less processing time, effort and resources in handling unnecessary requests from clients.

The methods described herein improve the throughput directly at the client by causing the client to avoid having to make requests for objects which are not stale or old. The methods described herein accelerate network communications by increasing the throughput of network communications to the subscriber by both reducing the number of needless requests made by the client of the server, and by increasing the throughput of information through the server by reducing the amount of needless processing performed by the server in handling requests for fresh objects, that is, objects that have not changed on the origin server.

Figure 5:
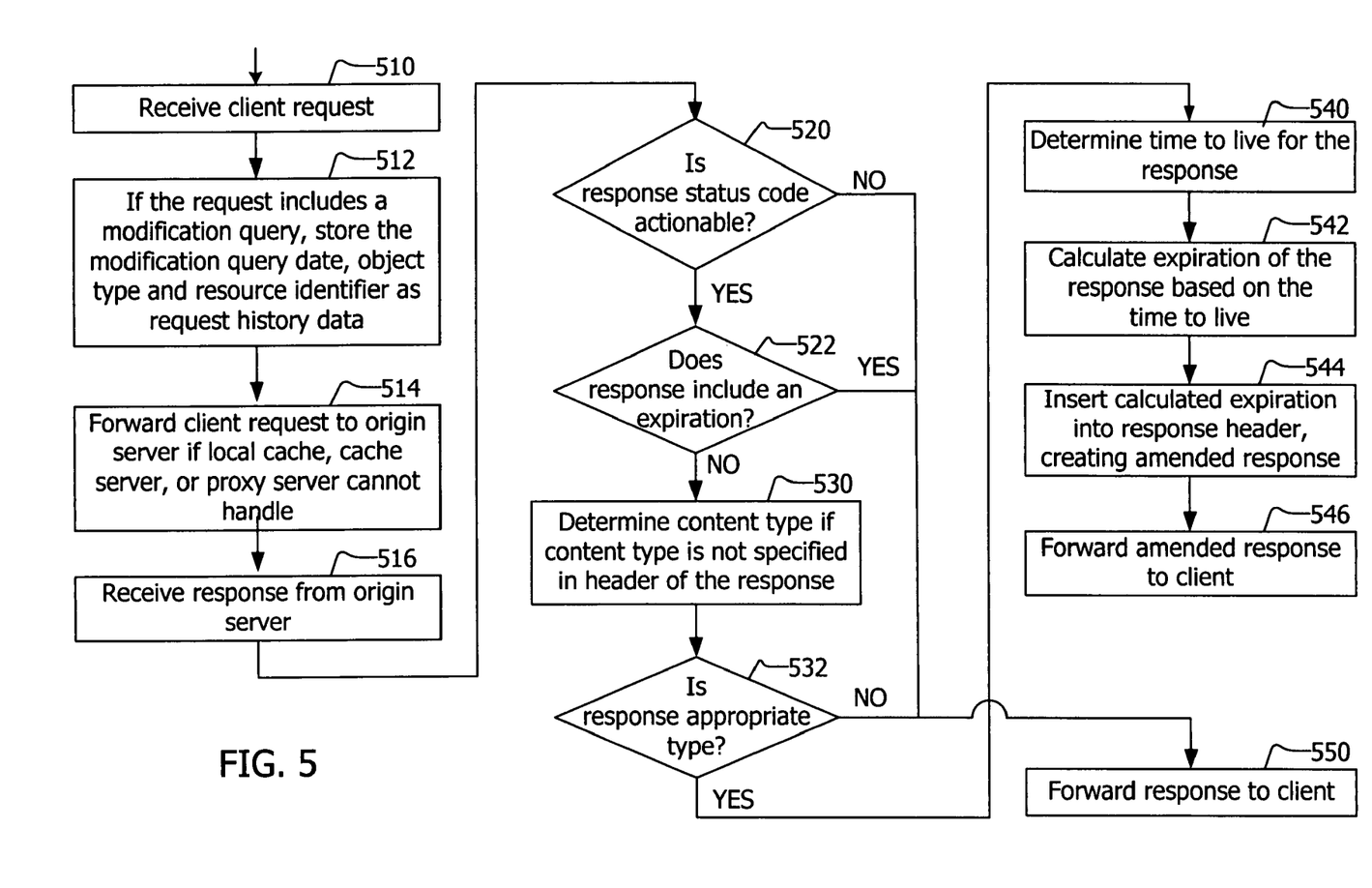
FIG. 5 is a flow chart of a second method in accordance with the invention.

FIG. 5 is a flow chart of a second method in accordance with the invention. A client request is received, as shown in block 510. If the request header includes a modification query, pertinent information from the modification query such as, for example, a date, an object type and the URI contained in the request, may be stored for later use as request history data, as shown in block 512. When the request is an HTTP request, the modification query may be an "if-modified-since" request header field.

A data structure such as a hash table may be used to store request history information such as a request time (obtained from the request), and a current time (the time of receiving the request). Each request may be assigned a request sequence number which may be a number that is incremented for each received request. The request history data may also include other time related data found in a request and/or a response, including modification query data such as an "if-modified-since" value included in a request, modification history data such as a "last-modified" value included in a response, the "time-to-live" value computed as described below, an expiration, either included in a response or calculated, and others. The request history data may be indexed and/or accessed by the request sequence number, or by other information stored as request history data.

The server may check to see if the client request may be serviced by referring to a local server cache, by referring to a local or remote cache server, or by referring to a local or remote proxy server. If the request cannot be handled by referring to a local cache, a cache server (local or remote) or a proxy server (remote or local), the request may be forwarded to the origin server, as shown in block 514.

The server may receive a response from the origin server, as shown in block 516, and may check whether the response includes an actionable status code, as shown in block 520. An actionable status code is a response that is included in an actionable status code list or group maintained by the server. The actionable status code list may signify OK, not modified, no changes made, and others. When using HTTP, the actionable status codes may include status codes 200 signifying "OK" and 304 signifying "not modified."

If the status code is actionable, a check may be made to determine whether the response includes an expiration, as shown in block 522. This analysis may be similar to that regarding block 420 of FIG. 4. If the response does not include an expiration, the response may be reviewed to determine the content type, or the content type may be retrieved from the response, as shown in block 530. When the response is an HTTP response, the "content-type" header may be examined to learn the type of object or objects included in the response.

A check may be made to determine whether a response is an appropriate type or if the object in the response is an appropriate type, as shown in block 532. This analysis may be similar to that regarding block 430 of FIG. 4. If the response is an appropriate type, a time-to-live for the response may be determined, as shown in block 540. The time-to-live may be calculated as described below with regard to FIG. 6. An expiration of the response may be calculated based on the time-to-live, as shown in block 542. The calculated expiration may be inserted into the response, creating an amended response, as shown in block 544. When the response is an HTTP response, the expiration may be added to the HTTP header of the response in the "Expires" field. The amended response may be forwarded to the client, as shown in block 546.

If the status code is not actionable, as shown in block 520; or if the response includes an expiration, as shown in block 522; or if the response if not an appropriate type as shown in block 532; the response is forwarded to the client without modification, as shown in block 550.

Figure 6:
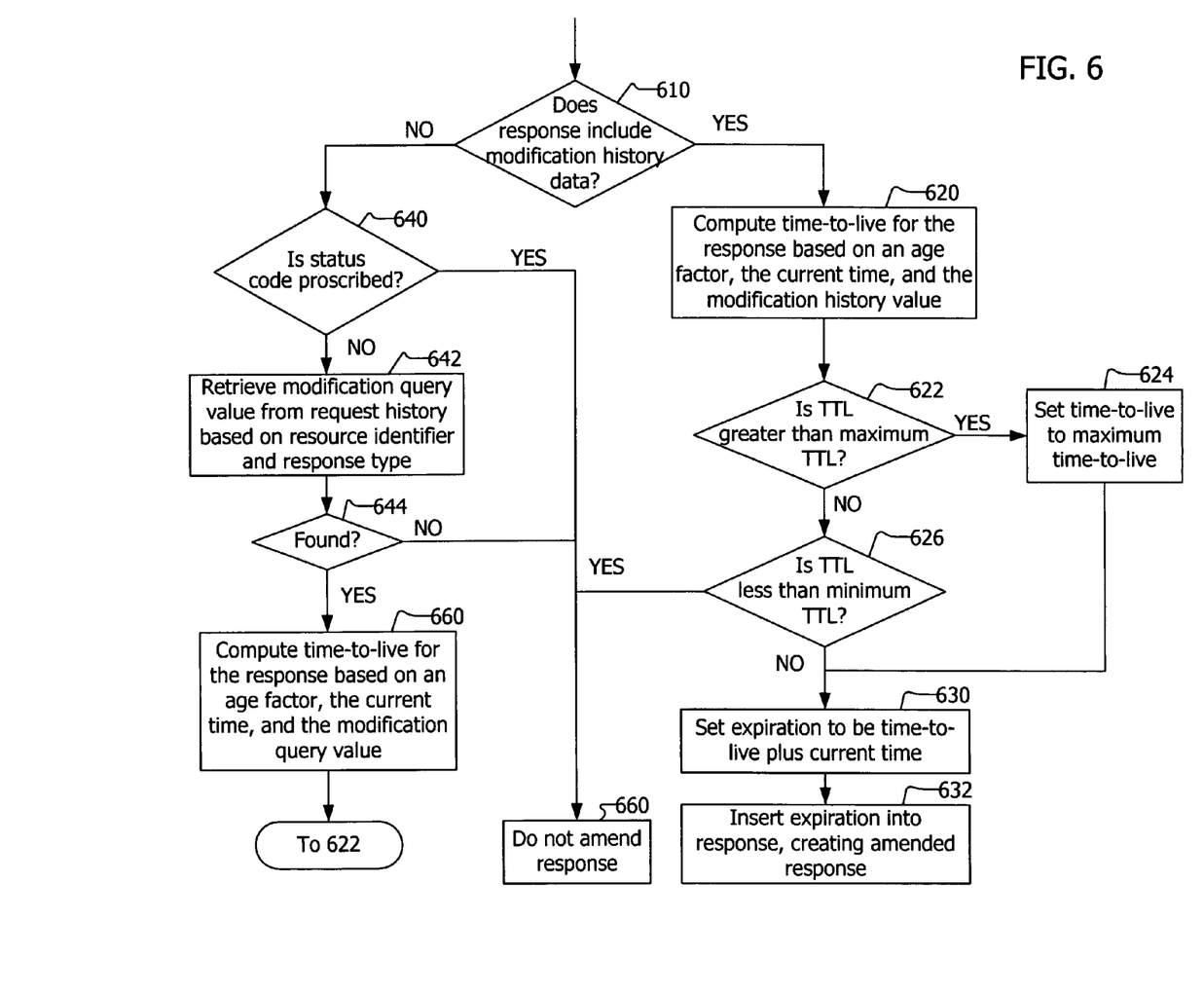
FIG. 6 is a flow chart of a method to compute the expiration of a response in accordance with the invention.

FIG. 6 is a flow chart of a method to compute the expiration of a response in accordance with the invention. The method described regarding FIG. 6 may replace blocks 540, 542 and 544 of FIG. 5. The method shown in FIG. 6 may be used to determine the time-to-live for a response and the expiration based thereon. A check may be made to determine whether the response includes modification history data, as shown in block 610. The modification history data may be a date and time when the object in the response was last modified. For example, when the response is an HTTP response the modification history data may be a "last-modified" header. The method may also be used with other kinds of responses having similar modification data in headers, fields, or similar information in the response.

If the response includes modification history data such as a last-modified header, the time-to-live (TTL) for the response may be made based on an age factor, the current time (T) and the last-modified value (LM), as shown in block 620. The age factor may be a number between 0 and 1, and/or may be a value determined to best optimize the results of the method. The age factor (AF) may be 0.08, 0.1, 0.25, 0.3, 0.8, and others. The computation described in block 620 may be computed according to the formula: $TTL=AF\times(T-LM)$.

A check may be made to determine whether the computed time-to-live is greater than a system defined maximum time-to-live, as shown in block 622. The system defined maximum time-to-live may be a constant that is found best to achieve the goals of the method. The system defined maximum time-to-live may be from a fraction of one day to fifty days, or more, and may be expressed in seconds, minutes, days, weeks, or months (e.g., 432,000 seconds, five days). If the time-to-live is greater than the system defined maximum time-to-live, the time-to-live may be set to be the system defined maximum time-to-live, as shown in block 624. The flow of actions then continues at block 630.

If the computed time-to-live is not greater than the system defined maximum time-to-live, a check may be made to determine whether the time-to-live is less than a system defined minimum time-to-live, as shown in block 626. The minimum time-to-live may be defined as a time such as, for example, two minutes, five minutes, twenty minutes, and others. The system defined minimum time-to-live may be a constant that is found best to achieve the goals of the method. If the computed time-to-live is not less than a system defined minimum time-to-live, the flow of actions continues at block 630.

At block 630, the expiration header is set to be the time-to-live plus the current time. The expiration header may be inserted or added to the response, creating an amended response, as shown in block 632.

If the computed time-to-live is less than a system defined minimum time-to-live, the response is not amended, as shown in block 660.

Returning to a discussion of block 610, if the response does not include modification history data such as a "last-modified" header, the status code included in the response is checked to determine if it is proscribed from further processing, as shown in block 640. This may be achieved by referring to a proscribed status code list stored on the server. The proscribed status code list may include the status code "OK". If the response status code is not proscribed, then an attempt is made to retrieve a modification query value from a stored or cached data structure, such as the request history hash table discussed above, based on the URI or other resource identifier and the response type included in the response, as shown in block 642. The modification query data may be an "if-modified-since" value as defined in the HTTP protocol. Similar headers or fields may be used to achieve the same result in other protocols, be they public, proprietary or other.

If the URI or other resource identifier and response type successfully retrieve a modification query value such as an "if-modified-since" (IMS) value, as shown in block 644, the time-to-live for the response is computed based on the age factor, the current time and the modification query value, as shown in block 650. The time-to-live may be computed according to the following formula: $TTL=AF\times(T-IMS)$. That is, when no "last modified" field or other modification history data is present in a response, a stored "if-modified-since" value or other modification query value that corresponds to the same URI or other resource identifier and object/response type may be used in its place. The flow of actions then continues at block 622, as set forth above.

If the response status code is proscribed, such as, for example, an OK such as code number 200 of the HTTP standard, or a similar proscribed response code; or if the URI or other resource identifier and response type cannot be found in the request history hash table or other stored or cached data structure, the response is not amended, as shown in block 660.

The time-to-live computation may also be made based on various circumstances and factors, such as, for example, the type of the object, the source URI of the object, the program that created the object, the size of the object, and others. The time-to-live computation in blocks 620 and 650 may also be based on the source URI or other resource identifier in the response. A check may be made to look up an age factor associated with a particular URI or other resource identifier. Similarly, an age factor may be used that corresponds to a particular response type or object type. In this way responses from websites may expire earlier or later as reflected in the age factor. Responses including certain kinds of objects may expire earlier or later as reflected in the age factor. Further, traffic analysis may be performed such that a server evaluates traffic patterns to discern which sizes, kinds, and types of files and specific files, as well as the sources and popularity of specific files are best suited for the header injection technique described herein. This traffic analysis and the results thereof may be used in addition to or in place of the computations using last-modified-since and if-modified-since as described herein.

With regard to blocks 622, 624 and 626, the maximum time-to-live and/or the minimum time-to-live may each be a system defined constant. To contour the method to further improve throughput, the maximum time-to-live and/or the minimum time-to-live may each be constants that are set for particular kinds of responses or kinds of objects. That is, the maximum time-to-live and/or the minimum time-to-live may each vary depending on whether the type of object is a graphic, is a video clip, is a PDF file, and others. In addition, the maximum time-to-live and/or the minimum time-to-live may each depend on a URI or other resource identifier. In this way, for example, website servers that are known to serve news or other timely information may have a maximum time-to-live shorter or smaller than other website servers. The maximum time-to-live and/or the minimum time-to-live may each depend on one, either, or neither of the type of object and the URI or other resource identifier specified.

With regard to FIGS. 4, 5 and 6, additional and fewer steps may be taken, steps may be added or removed, and the steps as shown may be combined or further refined to achieve the methods described herein. In addition, the steps taken may be organized in an order other than as shown and described herein.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method for increasing the throughput of network communications performed by a network access provider server, the method comprising:
the network access provider server establishing a connection with a client computer
the network access provider server receiving a request for a requested object from a requester, wherein the requester is a web browser on the client computer
the network access provider server storing request information included in the request as request history data
the network access provider server forwarding the request to a server
the network access provider server receiving a response from the server
the network access provider server reviewing the response to determine whether the response includes a native expiration
when the response does not include the native expiration
the network access provider server computing a computed expiration for the response, including
the network access provider server evaluating whether the response includes a modification history
when the response includes the modification history, the network access provider server computing a time-to-live for the res s onse based on an a e factor a current time and a value of the modification history
the network access provider server computing the computed expiration based on the current time and the time-to-live
when the response does not include the modification history,
the network access provider server retrieving a modification query value from the request history data based on a response type and a response location
when the modification query value is retrieved,
the network access provider server computing the time-to-live for the response based on an age factor, a current time and the modification query value,
the network access provider server computing the computed expiration based on the current time and the time-to-live
when the retrieving the modification query value is not successful,
the network access provider server forwarding the response to the requester
the network access provider server inserting the computed expiration into the response creating an amended response
the network access provider server forwarding the amended response to the requester, wherein the amended response includes the requested object
storing the amended response
the network access provider server providing the amended response to other requesters at other client computers that request the requested object, the providing achieved without additional communication with the server.

2. The method of claim 1 wherein the server comprises an origin server.

3. The method of claim 1 wherein when the response includes the native expiration, the network access provider server forwarding the response to the requester.

4. The method of claim 1 wherein the computed expiration is based on at least one of a response content type and a response resource identifier.

5. The method of claim 1 wherein the computed expiration is based on a time-to-live.

6. The method of claim 1 further comprising:
the network access provider server evaluating whether a content type of the response is appropriate;
the network access provider server performing the reviewing only when the content type of the response is appropriate.

7. The method of claim 6 wherein the network access provider server evaluating whether a content type of the response is appropriate comprises the network access provider server checking to determine whether the content type is in an appropriate type list.

8. The method of claim 7 wherein the appropriate type list comprises at least one of graphic, JavaScript, Cascading Style Sheet, portable document format (PDF), executable program, audio, video, and multimedia.

9. The method of claim 1 wherein the network access provider server receiving a request comprises the network access provider server storing request information as request history data.

10. The method of claim 1 wherein the request information includes a request resource identifier, a request content type, and a modification query when the modification query is present.

11. The method of claim 1 further comprising:
when the time-to-live is greater than a defined maximum, the network access provider server setting the time-to-live to be the defined maximum;
when the time-to-live is less than a defined minimum, forwarding the response to the requester.

12. The method of claim 1 wherein the request is a hypertext transfer protocol (HTTP) get, the modification query value is an HTTP if-modified-since value, and the modification history value is an HTTP last-modified value.

13. A method for increasing the throughput of network communications performed by a the network access provider server, the method comprising:
the network access provider server establishing a connection with a client computer
the network access provider server receiving a request for a requested object from a requester, wherein the requester is a web browser on the client computer
the network access provider server storing request information included in the request as request history data
the network access provider server forwarding the request to a server
the network access provider server receiving a response from the server
the network access provider server evaluating whether the response has a status code that is actionable
when the status code is actionable,
the network access provider server reviewing the response to determine whether the response includes a native expiration
when the response does not include the native expiration
the network access provider server calculating a calculated expiration for the response including
the network access provider server evaluating whether the response includes a modification history
when the response includes the modification history, the network access provider server computing a time-to-live for the response based on an a e factor, a current time and a value of the modification history the network access provider server computing the calculated expiration based on the current time and the time-to-live when the response does not include the modification history, the network access provider server retrieving a modification query value from the request history data based on a response type and a response location when the modification query value is retrieved, the network access provider server computing the time-to-live for the response based on an age factor, a current time and the modification query value, the network access provider server computing the calculated expiration based on the current time and the time-to-live when the retrieving the modification query value is not successful, the network access provider server forwarding the response to the requester the network access provider server inserting the calculated expiration into the response creating an amended response the network access provider server forwarding the amended response to the requester, wherein the amended response includes the requested object the network access provider server storing the amended response the network access provider server providing the amended response to other requesters on other client computers that request the requested object, the providing achieved without additional communication with the server when the response includes the native expiration, the network access provider server forwarding the response to the requester when the status code is not actionable, the network access provider server forwarding the response to the requester.

14. The method of claim 13 wherein the network access provider server evaluating whether the response has a status code that is actionable comprises the network access provider server checking to determine whether the response has a hyper-text transfer protocol (HTTP) status code of "OK" or "Not Modified".

15. A method for increasing the throughput of network communications performed by a network access provider server, the method comprising:

the network access provider server establishing a connection with a client computer the network access provider server receiving a request for a requested object from a requester, wherein the requester is a web browser on the client computer the network access provider server storing request information from the request as request history data the network access provider server forwarding the request to a server the network access provider server receiving a response from the server the network access provider server reviewing the response to determine whether the response includes a native expiration when the response does not include the native expiration the network access provider server evaluating whether a content type of the response is appropriate when the content type of the response is appropriate the network access provider server computing a calculated expiration for the response, including the network access provider server evaluating whether the response includes a modification history when the response includes the modification history, the network access provider server computing a time-to-live for the response based on an age factor, a current time and a value of the modification history the network access provider server calculating the calculated expiration based on the current time and the time-to-live when the response does not include the modification history, the network access provider server retrieving a modification query value from the request history data based on a response type and a response location when the modification query value is retrieved, the network access provider server computing the time-to-live for the response based on an age factor, a current time and the modification query value, the network access provider server calculating the calculated expiration based on the current time and the time-to-live when the retrieving the modification query value is not successful, the network access provider server forwarding the response to the requester the network access provider server inserting the calculated expiration into the response creating an amended response the network access provider server forwarding the amended response to the requester, wherein the amended response includes the requested object the network access provider server storing the amended response the network access provider server providing the amended response to other requesters on other client computers that request the requested object, the providing achieved without additional communication with the server when the content type of the response is not appropriate, the network access provider server forwarding the response to the requester when the response includes the native expiration, the network access provider server forwarding the response to the requester.

16. The method of claim 15 wherein the network access provider server evaluating whether a content type of the response is appropriate comprises the network access provider server checking to determine whether the content type is a graphic image.

17. The method of claim 16 wherein the network access provider server evaluating whether a content type of the response is appropriate comprises the network access provider server checking to determine whether the content type is one of a Graphics Interchange Format (GIF) file or Joint Photographic Experts Group (JPEG) file.

18. The method of claim 15 wherein the network access provider server evaluating whether a content type of the response is appropriate comprises the network access provider server checking to determine whether the content type is in an appropriate type list.

19. The method of claim 18 wherein the appropriate type list comprises at least one of graphic, JavaScript, Cascading Style Sheet, portable document format (PDF), audio, video, and multimedia.

20. The method of claim 15 wherein the calculated expiration is based on at least one of a response content type and a response resource identifier.

21. The method of claim 15 wherein the calculated expiration is based on a time-to-live.

22. The method of claim 15 wherein the network access provider server receiving a request comprises the network access provider server storing request information as request history data.

23. The method of claim 15 wherein the request information includes a request resource identifier, a request content type, and a modification query when the modification query is present.

24. The method of claim 15 further comprising:
when the time-to-live is greater than a defined maximum, the network access provider server setting the time-to-live to be the defined maximum;
when the time-to-live is less than a defined minimum, the network access provider server forwarding the response to the requester.

25. The method of claim 15 wherein the request is a hyper-text transfer protocol (HTTP) get, the modification query value is an HTTP if-modified-since value, and the modification history value is an HTTP last-modified value.

26. A storage medium having instructions stored thereon which when executed by a processor cause a network access provider server to perform operations comprising:
the network access provider server establishing a connection with a client computer
the network access provider server receiving a request for a requested object from a requester, wherein the requester is a web browser on the client computer
the network access provider server storing request information from the request as request history data
the network access provider server forwarding the request to a server
the network access provider server receiving a response from the server
the network access provider server reviewing the response to determine whether the response includes a native expiration
when the response does not include the native expiration
the network access provider server computing a computed expiration for the response, including
the network access provider server evaluating whether the response includes a modification history
when the response includes the modification history,
the network access provider server computing a time-to-live for the response based on an age factor, a current time and a value of the modification history
the network access provider server computing the computed expiration based on the current time and the time-to-live when the response does not include the modification history,
the network access provider server retrieving a modification query value from the request history data based on a response type and a response location
when the modification query value is retrieved,
the network access provider server computing the time-to-live for the response based on an age factor, a current time and the modification query value,
the network access provider server computing the computed expiration based on the current time and the time-to-live when the retrieving the modification query value is not successful,
the network access provider server forwarding the response to the requester
the network access provider server inserting the computed expiration into the response creating an amended response
the network access provider server forwarding the amended response to the requester, wherein the amended response includes the requested object
the network access provider server storing the amended response
the network access provider server providing the amended response to other requesters on other client computers that request the requested object, the providing achieved without additional communication with the server.

27. The storage medium of claim 26 wherein the server comprises an origin server.

28. The storage medium of claim 26 having further instructions stored thereon which when executed by the processor cause the network access provider server to perform further operations comprising: the network access provider server evaluating whether a content type of the response is appropriate; the network access provider server performing the reviewing only when the content type of the response is appropriate.

29. The storage medium of claim 28 wherein the network access provider server evaluating whether a content type of the response is appropriate comprises the network access provider server checking to determine whether the content type is in an appropriate type list.

30. The storage medium of claim 29 wherein the appropriate type list comprises at least one of graphic, JavaScript, Cascading Style Sheet, portable document format (PDF), audio, video, and multimedia.

31. The storage medium of claim 26 wherein
when the response includes the native expiration, the network access provider server forwarding the response to the requester.

32. The storage medium of claim 26 wherein the computed expiration is based on at least one of a response content type and a response resource identifier.

33. The storage medium of claim 26 wherein the computed expiration is based on a time-to-live.

34. The storage medium of claim 26 wherein the network access provider server receiving a request comprises the network access provider server storing request information as request history data.

35. The storage medium of claim 26 wherein the request information includes a request resource identifier, a request content type, and a modification query when the modification query is present.

36. The storage medium of claim 26 having further instructions stored thereon which when executed by the processor cause the network access provider server to perform operations further comprising:
when the time-to-live is greater than a defined maximum, the network access provider server setting the time-to-live to be the defined maximum
when the time-to-live is less than a defined minimum, the network access provider server forwarding the response to the requester.

37. The storage medium of claim 36 wherein the request is a hyper-text transfer protocol (HTTP) get, the modification query value is an HTTP if-modified-since value, and the modification history value is an HTTP last-modified value.

38. A network access provider server configured to accelerate network traffic delivery, the network access provider server comprising:
   a processor
   a memory coupled with the processor
   a storage medium having instructions stored thereon which when executed cause the network access provider server to perform actions comprising
      the network access provider server establishing a connection with a client computer
      receiving a request for a requested object from a requester, wherein the requester is a web browser on the client computer
      storing request information from the request as request history data
      forwarding the request to a server
      receiving a response from the server
      reviewing the response to determine whether the response includes a native expiration
      when the response does not include the native expiration
         computing a computed expiration for the response, including
            evaluating whether the response includes a modification history when the response includes the modification history,
            computing a time-to-live for the response based on an age factor, a current time and a value of the modification history
            computing the computed expiration based on the current time and the time-to-live
         when the response does not include the modification history,
            retrieving a modification query value from the request history data based on a response type and a response location
         when the modification query value is retrieved,
            computing the time-to-live for the response based on an age factor, a current time and the modification query value
            computing the computed expiration based on the current time and the time-to-live
         when the retrieving the modification query value is not successful, forwarding the response to the requester
      inserting the computed expiration into the response creating an amended response
      forwarding the amended response to the requester, wherein the amended response includes the requested object
      storing the amended response
      providing the amended response to other requesters on other client computers that request the requested object, the providing achieved without additional communication with the server.

39. The network access provider server of claim 38 wherein the server comprises an origin server.

40. The network access provider server of claim 38 having further instructions which when executed cause the processor to perform further operations comprising: evaluating whether a content type of the response is appropriate; performing the reviewing only when the content type of the response is appropriate.

41. The network access provider server of claim 40 wherein the evaluating whether a content type of the response is appropriate comprises checking to determine whether the content type is in an appropriate type list.

42. The network access provider server of claim 41 wherein the appropriate type list comprises at least one of graphic, JavaScript, Cascading Style Sheet, portable document format (PDF), audio, video, and multimedia.

43. The network access provider server of claim 38 wherein when the response includes the native expiration, forwarding the response to the requester.

44. The network access provider server of claim 38 wherein the computed expiration is based on at least one of a response content type and a response resource identifier.

45. The network access provider server of claim 38 wherein the computed expiration is based on a time-to-live.

46. The network access provider server of claim 38 wherein the receiving a request comprises storing request information as request history data.

47. The network access provider server of claim 38 wherein the request information includes a request resource identifier, a request content type, and a modification query when the modification query is present.

48. The network access provider server of claim 38 wherein the storage medium has further instructions stored thereon which when executed cause the computing device to perform further operations comprising:
   when the time-to-live is greater than a defined maximum, setting the time-to-live to be the defined maximum
   when the time-to-live is less than a defined minimum, forwarding the response to the requester.

49. The network access provider server of claim 48 wherein the request is a hyper-text transfer protocol (HTTP) get, the modification query value is an HTTP if-modified-since value, and the modification history value is an HTTP last modified value.

* * * * *

UNITED STATES PATENT AND TRADEMARK OFFICE
CERTIFICATE OF CORRECTION

PATENT NO. : 7,774,499 B1 Page 1 of 1
APPLICATION NO. : 10/699439
DATED : August 10, 2010
INVENTOR(S) : Popek et al.

It is certified that error appears in the above-identified patent and that said Letters Patent is hereby corrected as shown below:

Column 11, line 27: replace "res s onse" with --response--

Column 11, line 27: replace "a e" with --age--

Column 12, line 64: replace "a e" with --age--

Signed and Sealed this

Ninth Day of November, 2010

David J. Kappos
*Director of the United States Patent and Trademark Office*